US005605046A

United States Patent [19]

Liang

[11] Patent Number: 5,605,046
[45] Date of Patent: Feb. 25, 1997

[54] COOLED LINER APPARATUS

[76] Inventor: George P. Liang, 1431 SW. Eagle Nest Way, Palm City, Fla. 34990

[21] Appl. No.: 548,896

[22] Filed: Oct. 26, 1995

[51] Int. Cl.⁶ ............................................. F02C 7/18
[52] U.S. Cl. .................................. 60/752; 60/266
[58] Field of Search ........................... 60/752, 753, 755, 60/757, 265, 266, 754

[56] References Cited

U.S. PATENT DOCUMENTS

| | | | |
|---|---|---|---|
| 2,919,549 | 1/1960 | Haworth et al. | 60/39.65 |
| 3,831,258 | 8/1974 | Elbert et al. | |
| 4,020,542 | 5/1977 | Slaughter | 29/411 |
| 4,064,300 | 12/1977 | Bhangu | 428/120 |
| 4,071,194 | 1/1978 | Eckert et al. | 239/127.3 |
| 4,168,348 | 9/1979 | Bhangu et al. | 60/754 |
| 4,273,824 | 6/1981 | McComas et al. | 428/256 |
| 4,289,446 | 9/1981 | Wallace | 415/174 |
| 4,312,186 | 1/1982 | Reider et al. | 60/754 |
| 4,714,406 | 12/1987 | Hough | 415/170 R |
| 4,838,030 | 6/1989 | Cramer | 60/753 |
| 4,838,031 | 6/1989 | Cramer | 60/753 |
| 5,060,472 | 10/1991 | Schirtzinger | 60/265 |
| 5,184,455 | 2/1993 | Ewing et al. | 60/39.02 |
| 5,216,886 | 6/1993 | Ewing | 60/752 |
| 5,304,031 | 4/1994 | Bose | 415/173.4 |

Primary Examiner—Louis J. Casaregola
Attorney, Agent, or Firm—Richard D. Getz

[57] ABSTRACT

A cooled multi-wall liner is provided having an outer wall, an inner wall and a porous midsection disposed therebetween, attached to both walls. The outer wall includes a plurality of first apertures. The inner wall includes a plurality of sections separated by gaps. Fluid on the outer wall side of the liner at a pressure greater than fluid on the inner wall side of the liner may enter the liner through the first apertures, be diffused within the porous midsection, and exit the liner through the gaps between the sections of the inner wall.

5 Claims, 1 Drawing Sheet 5,605,046

COOLED LINER APPARATUS

BACKGROUND OF THE INVENTION

1. Technical Field

This invention relates to multi-wall liners in general, and to cooled multi-wall liners in particular.

2. Background Information

In gas turbine engines and other internal combustion devices it is common to utilize multi-wall liners between two fluids, one at a substantially higher temperature than the other. The "hot" fluid, referred to hereafter as "core gas", passes by the inner wall of the liner and the "cool" fluid, referred to hereafter as the "cooling gas", passes by the outer wall of the liner. If the temperature difference between the core gas and the cooling gas is great enough, the liner may experience undesirable thermal stress and strain. To minimize or eliminate the stress and strain, it is known to cool the liner with the cooling gas. For example, cooling gas provided at a higher pressure than the core gas is bled through apertures within the outer and inner walls of the liner, subsequently joining the core gas flow. As the cooling gas passes through the liner, thermal energy is transferred from the inner wall to the cooling gas, thereby decreasing the difference in temperature between the inner and outer wall.

There are several shortcomings to cooling a multi-wall liner in this manner. If the core gas temperature is high enough and the cooling air is not uniformly distributed, the inner wall may experience thermal distortion and failure in those areas insufficiently cooled. Inner walls having insulative or heat reflective coatings are particularly sensitive to thermal distortion. Distortion can cause a coating to crack and disengage, and thereby expose an unprotected section to hot core gas flow ultimately resulting in failure. Nonuniform distribution of cooling air also increases the likelihood that high temperature core gas will enter and damage the liner. Core gas passing by the inner wall is normally at a lower average pressure than that of the cooling gas within the multi-wall liner. At discrete spots, however, poorly distributed cooling gas within the liner may be at a lower pressure than that of the core gas, resulting in hot core gas influx. The problem is exacerbated when the pressure of the core gas flow is nonuniform and contains high pressure peaks.

What is needed, therefore, is a multi-wall liner that can accommodate at least two fluids at significantly different temperatures, and one that facilitates the proper distribution of cooling gas therewithin.

DISCLOSURE OF THE INVENTION

It is, therefore, an object of the present invention to provide a multi-wall liner that minimizes or eliminates thermal distortion within the hot-side wall.

It is a further object of the present invention to provide a multiwall liner that uniformly distributes cooling fluid.

It is a still further object of the present invention to provide a durable multi-wall liner.

It is a still further object of the present invention to provide a multi-wall liner that improves the durability of a coating attached to the hot-side wall of the liner.

It is a still further object of the present invention to provide a multi-wall liner that minimizes the required amount of cooling air by using cooling air more efficiently.

According to the present invention, a cooled multi-wall liner is provided :having an outer wall, an inner wall and a porous midsection disposed therebetween, attached to both walls. The outer wall includes a plurality of first apertures. The inner wall includes a plurality of sections separated by gaps. Fluid on the outer wall side of the liner at a pressure greater than fluid on the inner wall side of the liner may enter the liner through the first apertures, be diffused within the porous midsection, and exit the liner through the gaps between the sections of the inner wall.

According to one aspect of the present invention, second apertures are disposed in the porous midsection, and aligned with the first apertures within the outer wall.

The porous midsection of the present invention provides several advantages. First, the porous midsection uniformly distributes cooling air between the inner and outer walls, thereby avoiding "hot spots" and the thermal distortion that accompanies them. The uniform cooling air distribution also minimizes the chance that hot core gas will flow into the liner and cause damage therein. In both cases, the durability of the liner is improved. Another significant advantage of the present invention is that the durability of coatings attached to the inner wall is improved. The sectioning of the inner wall and the improved cooling uniformity minimizes or eliminates the thermal distortion that causes coatings to crack and separate from the inner liner.

A further advantage of the present invention is the liner uses cooling air in a more efficient manner. To overcome cooling deficiencies in prior art multi-wall liners, it is often necessary to pass more cooling air through the prior art liner than would be necessary if the cooling air was distributed properly. The improved distribution and flow paths through the present invention liner minimize the volume of cooling air required.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
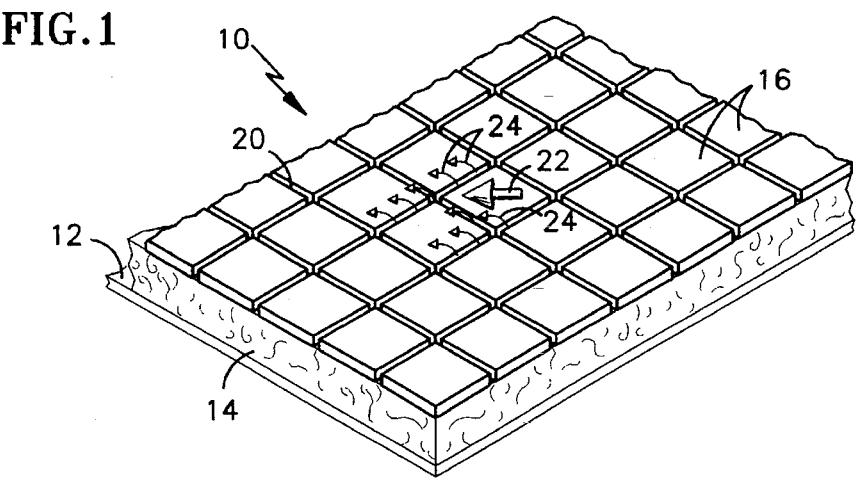
FIG. 1 is a diagrammatic cut away view of a liner.

Referring to FIG. 1, a liner 10 includes an outer wall 12, a porous midsection 14, and an inner wall 16. The outer wall 12 includes a plurality of first apertures 18 (see FIGS. 2 and 3) extending through the outer wall 12. In the best mode, the porous midsection 14 is a fibrous mat that is formed from randomly weaved fibers. Alternatively, the porous midsection 14 may be formed from solids having intradispersed voids through which fluids may flow. The porous midsection 14 is attached to the inner 16 and outer 12 walls by braze or other conventional means.

Figure 2:
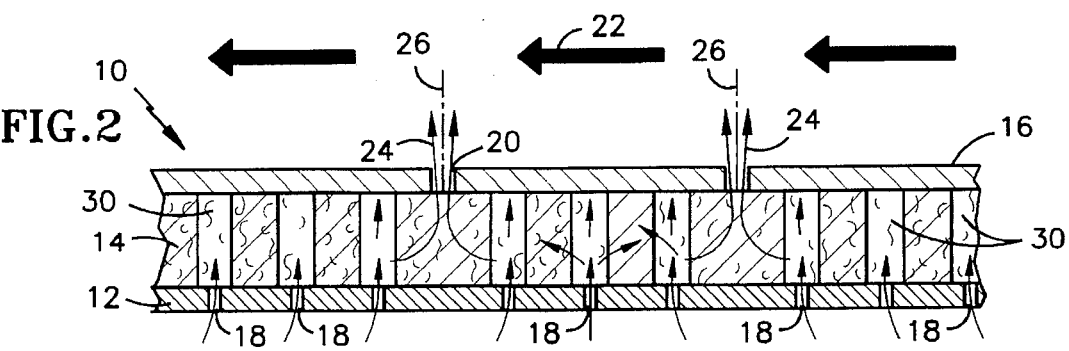
FIG. 2 is a cross-sectional diagrammatic view of a liner.
Figure 3:
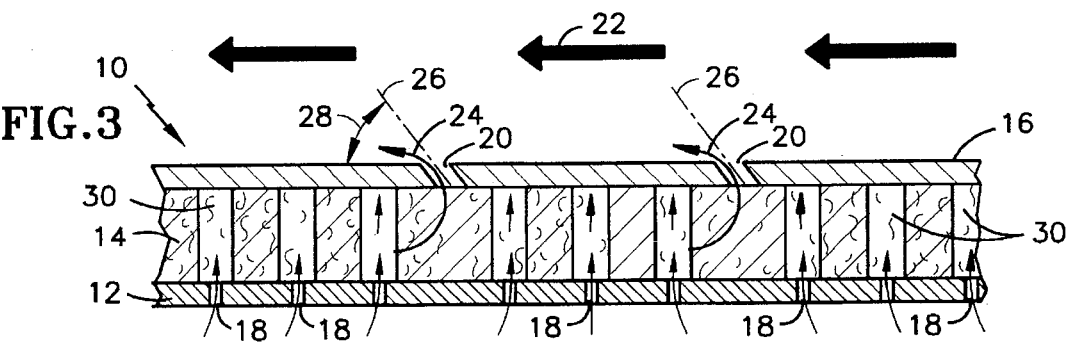
FIG. 3 is a cross-sectional diagrammatic view of a liner having skewed gaps between inner wall segments.

The inner wall 16 is attached to the porous midsection 14 as a single sheet. After the sheet is secured, the inner wall 16 is cut into a grid of gaps 20 and sections of inner wall 16 by a cutting tool. The remaining inner wall 16 may be described as sections of inner wall 16 separated by uniform gaps 20. Alternatively, the inner wall 16 could be attached to the porous midsection 14 as sections separated by gaps 20. The orientation of the gap grid 20 relative to the core gas flow 22 is such that the cooling gas 24 bleeding into the core gas flow 22 is drawn over the downstream sections of inner wall 16, cumulatively forming a boundary layer of cooling gas 24 disposed between the inner wall 16 and the core gas flow 22. The exact orientation of the gaps 20 relative to the core gas flow 22 may be adjusted to satisfy the needs of a particular application. The angle of the gaps 20 relative to the inner wall 16 may also be adjusted to effect the introduction of the cooling gas 24 into the core gas flow 22. FIG. 2 shows the gaps 20 substantially perpendicular to the inner wall 16. FIG. 3 shows the gaps 20 skewed relative to the inner wall 16 to enable the cooling gas 24 to enter the core gas flow 22 at an angle less than ninety degrees. The "skewing" of the gaps 20 may also be described in terms of each gap 20 having a centerline 26 and the centerline 26 being disposed at an acute angle 28 relative to the inner wall 16.

Referring to FIGS. 2 and 3, in the preferred embodiment, the porous midsection 14 includes a plurality of second apertures 30. The second apertures 30 have a larger diameter than the first apertures 18 within the outer wall 12. Each second aperture 30 is aligned with at least one first aperture 18, such that cooling gas 24 passing through the first aperture 18 enters the second aperture 30 and impinges on the inner wall 16. The smaller diameter of the first aperture 18 creates a pressure drop across the outer wall 12 and increases the velocity of the gas impinging against the inner wall 16. After impinging on the inner wall 16, the cooling gas 24 is diffused through the porous midsection 14. Subsequently, the cooling gas 24 passes through the gaps 20 between the sections of inner wall 16 and joins the core gas flow 22.

Although this invention has been shown and described with respect to the detailed embodiments thereof, it will be understood by those skilled in the art that various changes in form and detail thereof may be made without departing from the spirit and scope of the claimed invention.

I claim:

1. A cooled multi-wall liner, comprising:

a first wall, having a plurality of first apertures, each having a cross-sectional area;

a second wall, having a plurality of sections separated by gaps; and a porous midsection, disposed between and attached to said first and second walls;

wherein fluid on said first wall side of said liner at a pressure greater than fluid on said second wall side of said liner selectively enters said liner through said first apertures, is diffused within said porous midsection, and exits said liner through said gaps between said sections of said second wall.

2. A cooled multi-wall liner according to claim 1, wherein said porous midsection comprises a fibrous mat.

3. A cooled multi-wall liner according to claim 1, wherein said porous midsection further comprises:

a plurality of second apertures, extending from said first wall to said second wall, each having a cross-sectional area greater than that of said first apertures;

wherein each said second aperture is aligned with at least one of said first apertures, and each said second aperture is aligned with one of said sections of said second wall, such that said fluid selectively entering said liner through said first apertures enters into said second apertures and impinges on said sections of said second wall.

4. A cooled multi-wall liner according to claim 3, wherein said gaps between said sections of said second wall are aligned in a grid of parallel continuous gaps.

5. A cooled multi-wall liner according to claim 4, wherein said gaps between said sections of said second wall are centered on a centerline, and said center line is disposed at an acute angle with said second wall sections.

\* \* \* \* \*